US006824340B1

(12) United States Patent
Stout

(10) Patent No.: US 6,824,340 B1
(45) Date of Patent: Nov. 30, 2004

(54) TIE DOWN COUPLING SYSTEM

(76) Inventor: John Stout, 7041 S. 2700 East, Salt Lake City, UT (US) 84121

( * ) Notice: Subject to any disclaimer, the term of this patent is extended or adjusted under 35 U.S.C. 154(b) by 0 days.

(21) Appl. No.: 10/639,982

(22) Filed: Aug. 13, 2003

(51) Int. Cl.[7] .................................................. B60P 7/08
(52) U.S. Cl. ...................... 410/116; 410/106; 24/115 K
(58) Field of Search ............................... 410/101, 106, 410/110, 116; 24/115 K, 265 CD; 248/499

(56) References Cited

U.S. PATENT DOCUMENTS

| | | | |
|---|---|---|---|
| D310,017 S | 8/1990 | Matthews | D8/356 |
| 5,416,956 A | * 5/1995 | Rubin | |
| 5,836,060 A | 11/1998 | Profit | 24/698.2 |
| 5,915,900 A | * 6/1999 | Boltz | 410/110 |
| 5,971,684 A | 10/1999 | Wang | 410/107 |
| 5,984,100 A | 11/1999 | Ramsey et al. | 206/581 |
| 6,039,520 A | 3/2000 | Cheng | 410/106 |
| 6,113,328 A | * 9/2000 | Claucherty | 410/106 |
| 6,464,437 B1 | * 10/2002 | Elwell | 410/107 |
| 6,533,512 B2 | * 3/2003 | Lin | 410/102 |

* cited by examiner

*Primary Examiner*—Stephen Gordon
(74) *Attorney, Agent, or Firm*—Starkweather & Associates; Mike S. King; Jason P. Webb

(57) ABSTRACT

A device for attaching a rope thereto, having a rope holding mechanism comprising a first and second pinching members, coupled together to form a tapered space that includes a bight section, and a wide section; and a resilient device, coupled to the holding mechanism proximate to the bight section. The resilient device having a securing portion that secures the resilient device to the holding mechanism; and a holding portion that releasably holds the rope to the holding mechanism. There may be a base plate, including: an attachment plate section, and a storage plate section. There may be to provide a rotatable hinge device, mounted between the attachment plate section and the rope holding mechanism, designed to rotate in a clockwise and counter-clockwise fashion that is parallel to a surface of the base plate, and to rotate in an angle away from the surface of the base plate. There may be a support plate, coupled to the first and second pinching members, and having the resilient device mounted thereto so that the securing portion is positioned under the support plate, and the holding portion is positioned above the support plate. There may be a notch, positioned along the support plate to allow contact with the holding portion, having sufficient width to retain the rope therein. Additionally, there may be a holder, positioned on the storage plate section.

7 Claims, 2 Drawing Sheets

TIE DOWN COUPLING SYSTEM

BACKGROUND OF THE INVENTION

1. The Field of the Illustrated Embodiment(s)

The present invention relates generally to a tie down coupling system for ropes or cords. Specifically, there is a system for tying down ropes that utilizes a bight and locking mechanism that may be placed on vehicles or other objects needing ropes.

2. The Background Art

The use of ropes dates back to the earliest known tools ever used by man. Some of the earliest ropes known to exist were made of animal hair and leather. Modern man has developed ropes made out of almost any material, like hemp, nylon, cotton, even many types of metals. The one thing that all ropes, ancient to modern, have in common is that they have two free ends that need to be tied or connected to something to be useful. For example, ropes have been tied to themselves, to logs, to rings, to posts, or even to other ropes, as any First Class Boy Scout can demonstrate. The number of patents teaching of rope holding devices are copious. The following United States patents are offered as examples of those known to the inventor at the time of filing, and are herein incorporated by reference for their supporting teachings:

U.S. Pat. No. 5,984,100 is a decorative bathroom furnishing to be placed in a bathroom which provides concealed, sanitary storage of bathroom accessories and cleaning supplies, such as a toilet plunger, a toilet brush, a pair of rubber gloves, and a roll of toilet paper.

U.S. Pat. No. Des. 310,017 is a tie down device for truck beds.

U.S. Pat. No. 5,836,060 is a truck strap fastener adapted for either hook or flat iron attachment to either a downwardly directed hook or to a flat iron carried by standoffs attached to a trailer's frame.

U.S. Pat. No. 6,039,520 is a truck bed tie down anchor cleat for pickup utility vehicles that includes a clamp bracket in a u-shape having a pair of outwardly extending arms to which a pivotal latch plate is securely positioned therebetween.

U.S. Pat. No. 5,971,684 is a flush-mounted, spring-activated utility hook assembly designed to be attached to the side rails of a truck or to a vertical wall.

The problem with most of the known prior art tie down devices, for example, is that they often take two hands to attach the rope to the device, or that they are complex in design. Therefore, there is a need for a rope holding device that requires only one hand to operate and has a simple design.

SUMMARY OF THE ILLUSTRATED EMBODIMENT(S)

The present illustrated embodiment relates generally to a tie down coupling system for ropes. Specifically, there is a system for tying down ropes that requires only one hand and is simple in design. Uniquely, the illustrated embodiment utilizes a bight and locking mechanism.

There is also illustrated a device for attaching a rope thereto, having a rope holding device comprising a first and second pinching members, coupled together to form a tapered space that includes a bight section, and a wide section; and a resilient device, coupled to the holding mechanism proximate to the bight section. The resilient device having a securing portion that secures the resilient device to the holding mechanism; and a holding portion that releasably holds the rope to the holding mechanism.

Additionally, another feature of the present invention is to provide a base plate, including: an attachment plate section, and a storage plate section.

Moreover, a feature of the invention may be to provide a rotatable hinge device, mounted between the attachment plate section and the rope holding mechanism, designed to rotate in a clockwise and counterclockwise fashion that is parallel to a surface of the base plate, and to rotate in an angle away from the surface of the base plate.

Another feature may be to have a support plate, coupled to the first and second pinching members, and having the resilient device mounted thereto so that the securing portion is positioned under the support plate, and the holding portion is positioned above the support plate.

Still another feature may be to provide a notch, positioned along the support plate to allow contact with the holding portion, having sufficient width to retain the rope therein. Additionally, there may be a holder, positioned on the storage plate section, and comprising: a first holding groove that is designed to retain the first pinching member, and a second holding groove that is designed to retain the second pinching member; and a support plate holding cavity that is designed to hold the support plate therein.

Additional features and advantages of the invention will be set forth in the detailed description which follows, taken in conjunction with the accompanying drawings, which together illustrate by way of example, features of the invention. One skilled in the art of rope attachment devices will easily identify other applications of the essential features of the illustrated embodiment(s) after a review of the presented material, which are to be considered as equivalent devices as defined by the originally filed and resulting claims.

BRIEF DESCRIPTION OF THE DRAWINGS

In view of the features of the illustrated embodiment(s), which will become more readily apparent as the nature of the invention is better understood, the invention consists in the novel combination of parts that are hereinafter more fully described in the following specification and illustrated in the following drawings, where like numbers correspond to like elements between the various drawings, wherein.

DETAILED DESCRIPTION OF THE ILLUSTRATED EMBODIMENT(S)

Figure 1:
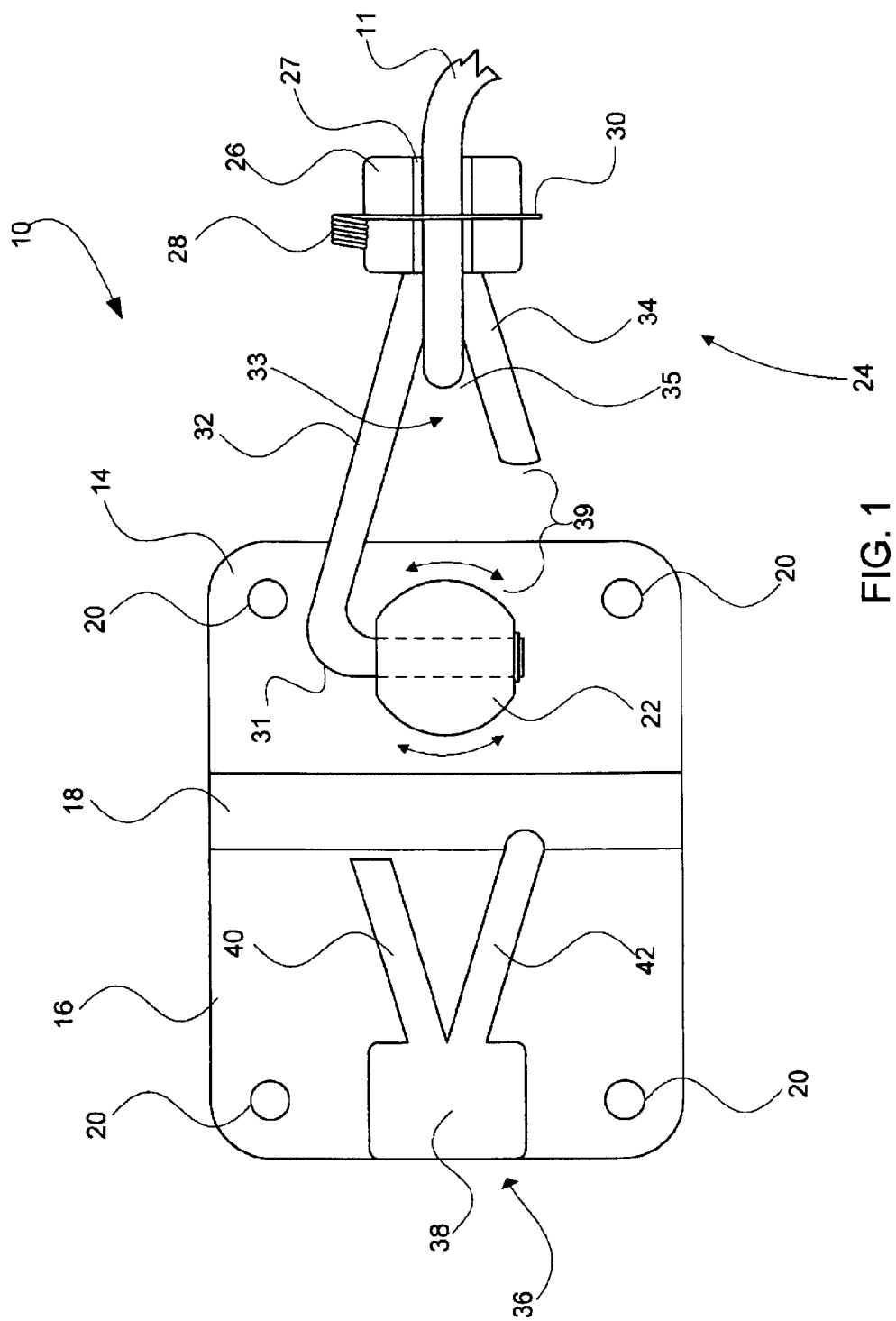
FIG. 1 is top view of an illustrated embodiment.

For the purposes of promoting an understanding of the principles of the invention, reference will now be made to the exemplary embodiment(s) illustrated in the drawings, and specific language will be used to describe the same. It will nevertheless be understood that no limitation of the scope of the invention is thereby intended by the specific description. Any alterations and further modifications of the inventive features illustrated herein, and any additional applications of the principles of the invention as illustrated herein, which would occur to one skilled in the relevant art and having possession of this disclosure, are to be considered within the scope of the invention and should be considered as equivalent devices or systems.

The present invention is used in the normal arena in which ropes are needed to attach objects together. It is noted that the use of the word "rope" is used in the broadest meaning of the word and should be considered to include, but not be limited to, cords, lines, string, cable, or wire. It is further noted that the word "plate" is used in its broadest meaning and should be considered to include, but not limited to, any sized and shaped object capable of supporting or mounting other features or items thereon, therein, or therethrough.

Figure 2:
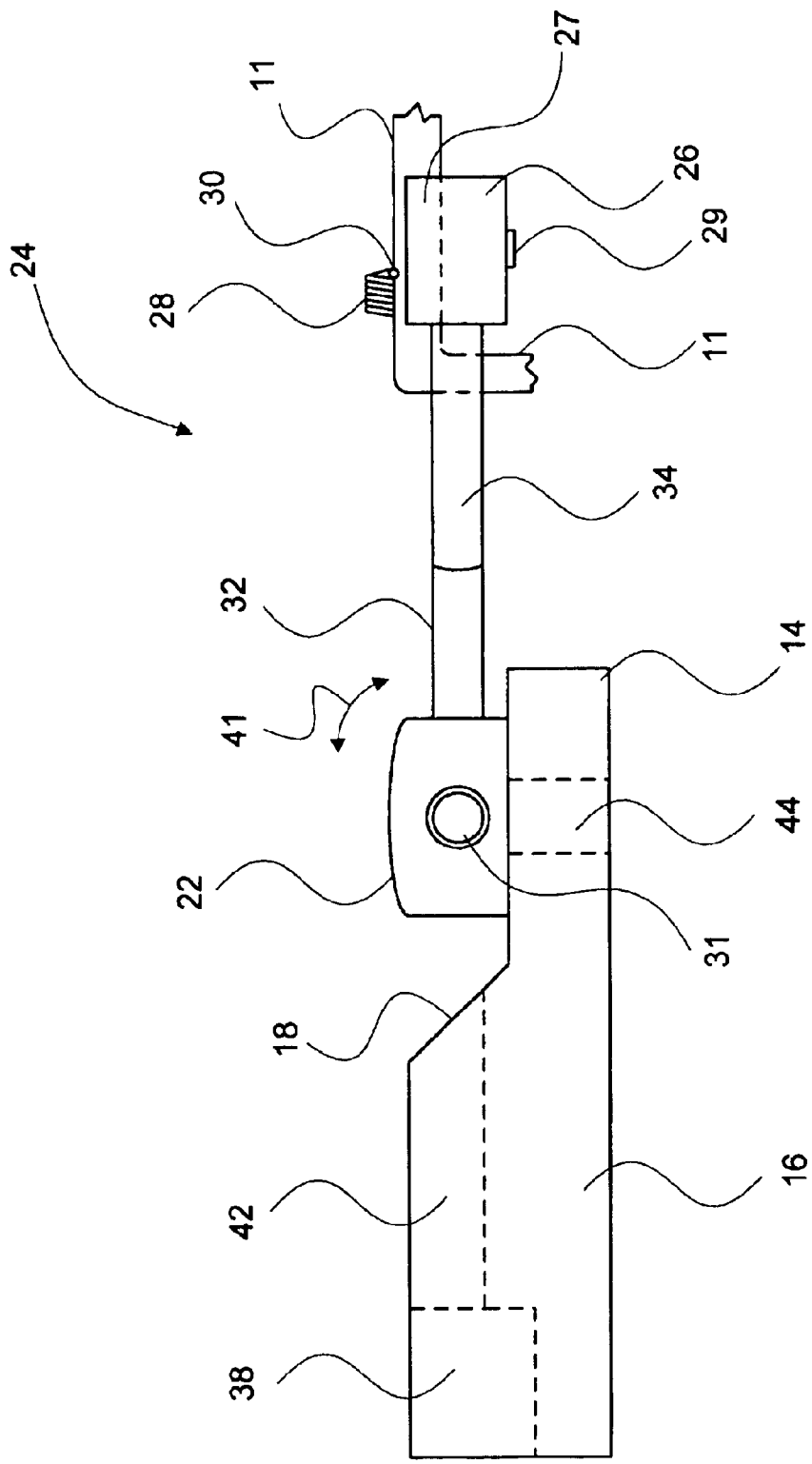
FIG. 2 is a side view of the illustrated embodiment of FIG. 1.

Regarding both FIGS. 1 and 2, there is depicted a top and side view of a rope attachment device 10 comprising the illustrated embodiment(s). Specifically, the rope attachment device 10 includes the following features: a rope 11, a base plate 12 that includes a thin attachment plate section 14, a thick storage plate section 16, and a transition plate section 18. Both thinner and thicker section plates 14,16 have holes 20 that may be employed to fasten the rope attachment device 10 to a supporting structure, like a truck, for example by placing screws (not illustrated) through the holes 20 in a known fashion for attachment. The thin plate section 14 has a rotatable hinge device 22 mounted thereon, which can rotate in a clockwise or counterclockwise fashion that is parallel to the base plate 12 surface, as illustrated. There is a rope holding mechanism 24, coupled to the thin plate section 14 via the hinge device 22, which allows the holding mechanism 24 to also rotate in a clockwise or counterclockwise direction. Preferably, at least 180 to more than 360 degrees, as illustrated.

The holding mechanism 24 includes several key features. There is a support plate 26 that may include a notch 27 designed to retain a portion of the rope 11 therethrough. There is a resilient device or spring 28. The spring 28 has at one end a securing portion or extension 29, which has the purpose of securing the resilient device 28 to the support plate 26. The spring 28 also has, at an opposite end to the extension 29, a holding portion 30, which has the function of securely and releasably holding the rope 11 tightly against the support plate 26. Wherein the rope is potentially nestled in the notch 27 if present. The resilient device 28 is illustrated in the form of a common compression spring, where the one end of the typical wire is extended across the top surface of the support plate 26 so that the holding wire 30 may be lifted to insert the rope 11 therein and the rope to be held in place by known resilient spring forces.

The holding mechanism 24 further includes first and second pinching members 32 and 34 that in a general sense approximately form a tapered space 33 therebetween as illustrated. Notably, the tapered space 33 has a narrower section 35, also referred to as a bight 35, may be located closer to the holding portion 30 than the wider section 37. The purpose of the tapered space is to allow a rope 11 to be placed in a wider section 37 and forcibly wedged into the bight 35 to crimp or compress the rope 11 therein, thus preventing the rope 11 from being dislodged or slid along the rope's longitudinal axis through the bight 35. It is noted that the rope 11 is illustrated to be crimped by showing a smaller diameter at the bight 35. There is also a rotate attachment member 31, which is coupled to the first pinching member 32, and rotatably fits through the rotatable hinge device 22.

It is noted that the illustrated embodiment depicts the second pinching member 34 to be shorter than the first pinching member 32 for the purpose of forming a rope insertion gap 39. A gap 39 allows for any section of rope 11, not just an end of the rope, to be placed into the tapered space 33. It is also noted that rope-holding mechanism 24 may rotate upward as illustrated by angle 41.

The rope attachment device 10 has a holder 36 that features an ability to securely fold up or collapse the overall device 10 into a compact shape. Specifically, there is a first holding groove 42 that is designed to retain the first pinching member 32, and a second holding groove 40, which is designed to retain the second pinching member 34. There is also a support plate holding cavity 38 that is designed to hold the support plate 26 therein. One skilled in the art will recognize that rotating the hinge device 22 will need to be rotated first in a clockwise or counterclockwise fashion that is parallel to the plate 14 surface to be placed into the holding position. Obviously, the spring 28 will need to be in an upward position for the rope-holding mechanism 24 to fit securely within the holding position. The holding position is not illustrated since one skilled in the art will easily understand the dynamics of the placement of the rope-holding mechanism 24 therein. It is noted that the holder 36 allows the rope attachment device 10 to have an open position, which allows for easy rope attachment, and a closed position, which allows for easy storage.

It is noted that one skilled in the art will recognize that the arrangement, positioning, and combination of the bite 35 and the holding portion 30 are intended to create an easy-to-use, simple mechanism that allows for one-handed use without requiring the tying of any rope portions to affect a secure hold of the rope 11.

VARIATIONS OF THE ILLUSTRATED EMBODIMENT(S)

It is understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. For example, it is illustrated that the first and second pinching members 32 and 34 are rod-like in design. However, a skilled artisan will easily understand after reviewing the illustrated embodiment(s) that any shaped members will function as a bite section 35. For example, flat, square or triangle shaped rods will properly function for the stated intended purpose.

Although the present embodiments have been illustrated with the use of a base plate 12 and other plate structure, there are many arrangements that are contemplated. For example, the plate structure may be in any shape or form, all being uniform in height, or having levels therein (as illustrated). The plate may also be designed to eliminate the holder 36. It is also contemplated to eliminate the plate and rotatable hinge device 22 altogether, thus providing only the rope holding mechanism 24. In this embodiment, the rotatable attachment member 31 would be adapted to have an attachment means. The attachment means could be designed to attach to another rope and could be in the form of a loop shape or even another rope holding mechanism 24.

Although the present embodiment(s) illustrate the use of a support plate 26, it is contemplated to have many forms of this feature. For example, any form of a support shape may be utilized, like a round shape, or square, or no plate at all. If no plate existed, then obviously, the first and second pinching members 32, 34 would form the surface in which the holding member 30 would have a rope compressed thereto.

Although it is illustrated to have the holding mechanism 36 arranged in the illustrated fashion, it is contemplated to have many variations. For example, grooves 40 and 42 could be switched, and a deeper spring groove could be placed in section 38 to accommodate the dimensions of the spring 28.

In this fashion, there would be an elimination of one of the rotation steps of the rope holding mechanism 24 to fit theretogether.

Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A device for attaching a rope thereto, having a rope holding mechanism comprising:
    first and second pinching members, coupled together to form a tapered space that includes a bight section, and a wide section; and
    a resilient device, coupled to the holding mechanism proximate to the bight section, and having:
        a securing portion that secures the resilient device to the holding mechanism; and
        a holding portion that releasably holds the rope to the holding mechanism.

2. The device of claim 1, further comprising a base plate, including:
    an attachment plate section, and
    a storage plate section.

3. The device of claim 2, further comprising a rotatable hinge device, mounted between the attachment plate section and the rope holding mechanism, designed to rotate in a clockwise and counterclockwise fashion that is parallel to a surface of the base plate, and to rotate in an angle away from the surface of the base plate.

4. The device of claim 3, further comprising a support plate, coupled to the first and second pinch members, and having the resilient device mounted thereto so that the securing portion is positioned under the support plate, and the holding portion is positioned above the support plate.

5. The device of claim 4, further comprising a notch, positioned along the support plate to allow contact with the holding portion and having sufficient width to retain the rope therein.

6. The device of claim 5, wherein the resilient device is a common compression spring.

7. The device of claim 6, further comprising:
    a holder, positioned on the storage plate section the holder having:
        a first holding groove that is designed to retain the first pinching member; and
        a second holding groove that is designed to retain the second pinching member, and
    a support plate holding cavity that is designed to hold the support plate therein.

\* \* \* \* \*